United States Patent [19]

Bohrmann et al.

[11] 4,156,020

[45] May 22, 1979

[54] PROCESS FOR PRODUCING A DRY PRODUCT FOR FOOD PREPARATIONS

[75] Inventors: Hans Bohrmann, Talheim; Klaus Bezner, Heilbronn, both of Fed. Rep. of Germany; Richard Sidler, Flurlingen, Switzerland

[73] Assignee: CPC International Inc., Englewood Cliffs, N.J.

[21] Appl. No.: 815,757

[22] Filed: Jul. 14, 1977

Related U.S. Application Data

[63] Continuation of Ser. No. 606,382, Aug. 20, 1975, abandoned.

[30] Foreign Application Priority Data

Aug. 21, 1974 [DE] Fed. Rep. of Germany ....... 2439993

[51] Int. Cl.$^2$ ........................... A23L 1/34; A23L 1/40; A23L 1/195
[52] U.S. Cl. ..................................... 426/96; 426/103; 426/285; 426/289; 426/589; 426/590
[58] Field of Search ................... 426/589, 96, 103, 97, 426/285, 294, 295, 289, 661, 456, 590

[56] References Cited

U.S. PATENT DOCUMENTS

| 3,100,909 | 8/1963 | Schapiro | 426/285 |
| 3,607,306 | 9/1971 | McMichael | 426/589 |
| 3,850,838 | 11/1974 | Guckenberger et al. | 426/103 X |

FOREIGN PATENT DOCUMENTS

7117930  5/1971  Japan ..................... 426/589

*Primary Examiner*—Kenneth M. Schor

[57] ABSTRACT

An edible, hydrophilic substance is wetted with water or an aqueous liquid to form a crumbly mass which is then uniformly mixed. A starch or starch-containing material is then folded into the mixed mass until a homogeneous blend is obtained which is then conditioned, crushed, if desired, dried and sifted to a particle size of about 100 to 300 microns. The weight ratio of hydrophilic substance to water and starch is such that the conditioned product is in the form of agglomerates comprising starch nuclei particles that are surrounded by or embedded in a protective layer of the hydrophilic substance.

The agglomerated product obtained can be mixed or blended with dry food ingredients to obtain an instant food product that can be readily and easily prepared by stirring in hot or cold water and which is free of lumps.

13 Claims, No Drawings

PROCESS FOR PRODUCING A DRY PRODUCT FOR FOOD PREPARATIONS

This is continuation, of application Ser. No. 606,382 filed Aug. 20, 1975, now abandoned.

This invention relates to a process for producing a dry product for food preparations which readily and easily swell and dissolve in water or aqueous liquids without forming lumps.

BACKGROUND OF THE INVENTION

It has been known that binders, such as starch or starch-containing flours, can be sprayed with water, steam or aqueous salt or sugar solutions and that the agglomerates formed during this process can then be dried such as by means of a fluidized bed. However, this process cannot be applied when using pregelatinized starch or flours containing pregelatinized starch wherein the starch is present in a cold-swelling state. Wetting of these products, even when treated with steam, results in the formation of lumps. Consequently, the food preparations made using these products also contain lumps and do not swell easily in water and other aqueous liquids.

GENERAL DESCRIPTION OF THE INVENTION

It has now been found that these disadvantages can be avoided by wetting edible, hydrophilic substances with a sufficient amount of water or aqueous liquid to form a crumbly mass; thoroughly mixing the mass to uniformity; folding starch or a starch-containing material into the mixed, crumbly mass until it is homogeneous; conditioning the homogeneous mass; crushing it if desired; and, drying and sifting the mass, the ratio of hydrophilic substance to water and starch being such that the conditioned product is present in the form of agglomerates in which the starch particles are the nuclei and are surrounded by or embedded in a protective layer of hydrophilic substance.

As used throughout this application and in the appended claims, it should be understood that the expressions "conditioning" and/or "conditioned" refers to the quiescent that is, non-agitated, state of the homogeneous mass obtained immediately after the starch or starch-containing material has been folded into it. This conditioning generally occurs over a period of about 20–40 minutes during which time the mass is permitted to equilibrate, with regard to temperature and moisture, and become hardened so that it can then be readily and easily broken up.

In carrying out the invention, it is advantageous to wet the hydrophilic substances with about 3 to 30% by weight of water or aqueous liquid, based upon the weight of the hydrophilic substances, to form the crumbly mass which is then mixed uniformly.

Starch or starch-containing material is preferably folded into the mixed mass in an amount of about 25 to 75% by weight based upon the weight of the crumbly mixed mass.

It is important that the water is first combined with the edible, hydrophilic substances, which are preferably in crystalline form, so that the starch is coated by the hydrophilic substances. When this starch-coated product is then placed in water or aqueous liquids or when the aqueous liquids are poured over it, the hydrophilic substances will dissolve first and permit the water to penetrate into the starch particles without causing lump formation. This is an extremely important aspect in the manufacture of instant food products which are prepared for consumption by being stirred into cold or hot water, or ideally, are strewn into cold or hot water or over which water can be poured without resulting in the formation of lumps.

The edible, hydrophilic substances are preferably sugars, such as lactose, sucrose, dextrose, glucose syrup and maltodextrin; sugar alcohols such as sorbitol and mannitol; organic acids; inorganic salts, such as sodium chloride, and sodium glutamate, or mixtures thereof.

Suitable starches include native starches such as corn, wheat, rice, potato and tapioca starches and waxy starches, edible modified starches such as pregelatinized starches, roast dextrins, thin-boiling starches, oxidized starches, starch esters and starch ethers, or mixtures thereof.

Drying of the agglomerated, conditioned and, if desired, crushed mass is preferably to a water content of about 2 to 10%, and it is advantageous to sift the dried agglomerates to a grain size between about 100 and 300 microns.

If desired, the food preparations made from the dry products can be modified to exhibit specific properties in terms of structure and viscosity. Instead of the starch or starch-containing flours, other edible, high-molecular weight vegetable binders can be used such as pectin, alginates, carrageenates, agar-agar, tragacanth, gum arabic, guar meal and carob kernel meal, or gelatin in an amount of up to about 25% by weight based upon the dry weight of the starch or starch-containing material.

In the manufacture of dry products for specific instant preparations, e.g. soups and beverages, all or part of the desired flavoring and/or coloring matters can be added to the hydrophilic substances, which have been wetted to form a crumbly mass, before adding the starch. Alternatively, aqueous liquids, such as fruit juices, wine, milk, and the like can be used instead of water to wet the edible, hydrophilic substances.

SPECIFIC EMBODIMENTS: EXAMPLES

The following examples are set forth to more clearly illustrate the invention and it should be understood that they are presented as being exemplary and not limitative of the invention.

EXAMPLE 1

Basic Product 1—Milk Shake Powder

In a Hobart mixer, 450 g lactose is uniformly mixed with 75 ml water to form a crumbly mass. Then, 300 g pregelatinized starch is introduced and folded in until homogeneity is reached. After 20 to 30 minutes of conditioning, the agglomerated product is coarsely crushed, dried in a vacuum dryer to a water content of about 5%, and then sifted to a grain size of 225 microns.

On the basis of this basic product, a dry product for milk shakes can be produced according to the following formula:

| Ingredient | | Amount |
| --- | --- | --- |
| Basic product 1 | | 50 g |
| Dextrose | | 50 g |
| Powdered sugar | | 50 g |
| Fruit powder | | 70 g |
| | Total | 220 g |

The dry product can be stirred easily into 1 liter of cold milk to yield a fruit-flavored milk shake free of lumps.

EXAMPLE 2

Basic Product 2—Oxtail Soup Powder

Lactose in an amount of 15 to 50 parts by weight and 10 to 25 parts by weight of maltodextrin are uniformly mixed with 50 to 20 parts by weight of water (referred to as lactose+maltodextrin solids) to form a crumbly mass. Then, 45 to 55 parts by weight of corn starch (referred to as the crumbly mass) are folded in until homogeneity is reached. After 20 to 30 minutes of conditioning, the agglomerated product is coarsely crushed, dried in a fluidized bed dryer to a water content of about 8%, and sifted to a grain size between 200 and 300 microns.

On the basis of this basic product 2, an instant oxtail soup powder is produced by blending the following ingredients:

| Ingredients | Parts by Weight |
| --- | --- |
| Basic product 2 | 53.2 |
| Red wine powder, spray-dried | 4.0 |
| Tomato powder, spray-dried | 6.0 |
| Seasoning & dehydrated vegetable blend | 26.3 |
| Sunflower fat, liquid | 10.0 |
| Dry caramel | 0.5 |
| Total | 100.0 |

Sixty (60) to 70 g of this dry product is stirred into ½ liter of boiling water to readily and easily yield an oxtail soup free of lumps, with no prolonged cooking being required for the preparation.

EXAMPLE 3

Basic Product 3—Instant Tomato Powder

Fifteen (15) to 35 parts by weight lactose, 8 to 20 parts by weight dextrose, 6 to 10 parts by weight sodium chloride and 6 to 8 parts by weight monosodium glutamate are uniformly mixed with 20 parts by weight water (referred to as solids of the mixture of hydrophilic substances) to form a crumbly mass. Then, 55 parts by weight of a mixture of equal parts by weight of pregelatinized starch and thin boiling corn starch (referred to as the crumbly mass) are folded in until homogeneity is reached. After 20 minutes of conditioning, the agglomerated product is coarsely crushed, dried in a vacuum dryer to a water content of about 7%, and sifted to a grain size between 200 and 250 microns.

On the basis of this basic product, an instant tomato powder is produced by blending the following ingredients:

| Ingredients | Parts by Weight |
| --- | --- |
| Basic product 3 | 36.5 |
| Tomato powder, spray-dried | 39.4 |
| Sucrose | 3.0 |
| Powdered skimmed milk | 4.8 |
| Seasoning & dehydrated vegetable blend | 9.3 |
| Hydrolized vegetable protein powder | 2.5 |
| Sunflower fat, liquid | 4.5 |
| Total | 100.0 |

Sixty (60) to 70 g of this mixture is easily and readily stirred into ½ liter of water heated to between about 70° and 90° C. to yield a tomato soup free of lumps. No heating to boiling or prolonged cooking is required.

EXAMPLE 4

Basic Product 4—Instant Pea Soup Powder

Twenty (20) to 52 parts by weight lactose and 5 to 13 parts by weight sorbitol are uniformly mixed with 10 to 15 parts by weight water (referred to as lactose+sorbitol solids) to form a crumbly mass. Then, 35 to 75 parts by weight of a mixture of equal parts of pregelatinized potato and corn starch (referred to as the crumbly mass) are folded in until homogeneity is reached. After 20 to 30 minutes of conditioning, the agglomerated product is coarsely crushed, dried to a water content of about 5 to 7%, and sifted to a grain size between 250 and 300 microns.

On the basis of this basic product, an instant pea soup powder, is produced by blending the following ingredients:

| Ingredient | Parts by Weight |
| --- | --- |
| Basic product 4 | 35.2 |
| Pease-meal, green (without hulls) | 35.2 |
| Hydrolyzed vegetable protein powder | 2.5 |
| Sodium Chloride | 1.9 |
| Monosodium glutamate | 4.5 |
| Seasoning & dehydrated vegetable blends | 8.0 |
| Fat bacon, minced | 3.2 |
| Sunflower fat, liquid | 9.5 |
| Total | 100.0 |

Fifty (50) to 60 g of this mixture is stirred easily and without lump formation into ½ liter of water heated to between 70° and 90° C. to yield a pea soup. No heating to boiling or prolonged cooking is required.

EXAMPLE 5

Basic Product 5—Instant Dessert Powder

In a Hobart mixer, 250 g lactose, 100 g sucrose and 100 g dextrose are uniformly mixed with 80 ml water to form a crumbly mass. Then, 350 g pregelatinized starch is introduced and folded in until homogeneity is reached. After 25 minutes of conditioning, the aggolomerated product is coarsely crushed, dried in a vacuum dryer to a water content of about 5%, and sifted to a grain size of 150 microns.

On the basis of this basic product, an instant dessert powder is produced by blending the following ingredients:

| Ingredients | Parts by Weight |
| --- | --- |
| Basic product 5 | 62.4 |
| Sucrose | 29.7 |
| Tetrasodium pyrophosphate | 2.4 |
| disodiumhydrogen phosphate | 2.4 |
| Bourbon vanilla | 3.0 |
| Coloring matter | 0.1 |
| Total | 100.0 |

Thirty (30) to 40 g of this mixture is easily and readily stirred without lump formation into 300 ml of cold or hot milk to yield an instant dessert.

While the invention has been described in detail with reference to specific embodiments thereof, it should be understood and will be recognized by those skilled in the art that various changes and modifications can be made therein without departing from the scope of the invention.

What is claimed is:

1. A process for producing a dry edible product in the form of agglomerates having starch nuclei, each nucleus being embedded in a layer of a hydrophilic substance, for use in blending with dry food ingredients to form an instant food product capable of being readily and easily dissolved in water without forming lumps, said process comprising the following steps:
   (a) first preparing a homogeneous, conditioned mass of hydrophilic substance, moisture and starch, said preparation consisting of the steps of
      (1) first mixing together, to form a crumbly mass, at least one edible, hydrophilic substance with water or an aqueous liquid in an amount of from 3% to 30% by weight based on the weight of the hydrophilic substance,
      (2) then folding into said crumbly mass a starch or starch-containing material in an amount of from 25% to 75% by weight, based on the weight of the crumbly mass, until a homogeneous mass is obtained, and
      (3) then conditioning the homogeneous mass at ambient temperature and without agitation for at least about twenty minutes;
   (b) then drying the mass to a moisture content of from about 2% to about 10%; and
   (c) then sifting the dry product to a particle size of from about 100 microns to about 300 microns;
   (d) whereby discrete particles consisting essentially of nuclei of starch or a starch-containing material with each nucleus embedded in a layer of a hydrophilic substance are formed, and wherein said hydrophilic substance is a member from the group consisting of sugars, sugar alcohols, inorganic salts, sodium glutamate and mixtures thereof.

2. The process of claim 1 wherein said starch or starch-containing material is selected from the group consisting of native ungelatinized starches, native pre-gelatinized starches, edible modified ungelatinized starches, edible modified pre-gelatinized starches, and mixtures thereof.

3. The process of claim 1 wherein edible, high molecular weight, vegetable binders, or gelatin are used in place of said starch or starch-containing materials in an amount of up to about 25% by weight based upon the weight of said starch or starch-containing material.

4. The process of claim 1 which includes adding flavoring and coloring agents to said hydrophilic substances, said agents having been wetted to form a crumbly mass prior to the addition of said starch or starch-containing material therein.

5. The process of claim 1 wherein said sugars are selected from the group consisting of lactose, sucrose, dextrose, glucose syrup and maltodextrin; and, said sugar alcohols are selected from the group consisting of sorbitol and mannitol.

6. The process of claim 3 wherein said vegetable binders are selected from the group consisting of pectin, alginates, carrageenates, agar-agar, tragacanth, gum arabic, guar meal and carob kernel meal.

7. A dry, agglomerated product for food preparations comprising:
   discrete particles of about 100–300 microns consisting essentially of nuclei of starch or a starch-containing material, each nucleus being embedded in a layer of hydrophilic substance, said particles having a water content of about 2–10%, and having been formed by first mixing together, to form a crumbly mass, at least one edible, hydrophilic substance with water or an aqueous liquid in an amount of from 3% to 30% by weight based on the weight of the hydrophilic substance, then folding into said crumbly mass a starch or starch-containing material, in an amount of from 25% to 75% by weight, based on the weight of the crumbly mass, until a homogeneous mass is obtained and then conditioning the homogeneous mass at ambient temperature for at least about twenty minutes without agitation of the mass during conditioning; then drying the mass to a moisture content of about 2–10%, and then sifting the dry product to a particle size of 100–300 microns
   said hydrophilic substance being a member from the group consisting of sugars, sugar alcohols, inorganic salts, sodium glutamate and mixtures thereof; and
   said agglomerated product, when blended with dry food ingredients, forming an instant food product which is capable of being readily and easily dissolved in water without forming lumps.

8. The dry product of claim 7 wherein said sugars are selected from the group consisting of lactose, sucrose, dextrose, glucose syrup and maltodextrin; said sugar alcohols are selected from the group consisting of sorbitol and mannitol; and, said inorganic salt is sodium chloride.

9. The dry product of claim 7 wherein said hydrophilic substance also contains flavoring and coloring agents.

10. A product in accordance with claim 7, which, when blended with dry food ingredients, forms an instant food product which is capable of being readily and easily dissolved in hot water without forming lumps, wherein the starch or starch containing material forming the nuclei of the discrete particles is a member selected from the group consisting of ungelatinized native starch, ungelatinized edible modified starch, pregelatinized native starch, pregelatinized edible modified starch, and mixtures thereof.

11. A product in accordance with claim 7, which, when blended with dry food ingredients, forms an instant food product which is capable of being readily and easily dissolved in hot or cold water without forming lumps, wherein the starch or starch containing materials forming the nuclei of the discrete particles is a member selected from the group consisting of pregelatinized native starch, pregelatinized edible modified starch, and mixtures thereof.

12. A dry product in accordance with claim 7 wherein the nuclei of the particles contain, in addition to the starch or starch containing material, up to about 25% by weight, based upon the weight of the starch or starch containing material, of gelatin or one or more edible high molecular weight vegetable binders.

13. The dry product of claim 12 wherein said vegetable binders are selected from the group consisting of pectin, alginates, carrageenates, agar-agar, tragacanth, gum arabic, guar meal, and carob kernel meal.

* * * * *